United States Patent
Torkelson et al.

(10) Patent No.: US 11,643,511 B2
(45) Date of Patent: May 9, 2023

(54) METHODS OF FORMING CROSSLINKED POLYOLEFIN NANOCOMPOSITES HAVING HIGH WEAR RESISTANCE

(71) Applicant: Northwestern University, Evanston, IL (US)

(72) Inventors: John M. Torkelson, Skokie, IL (US); Tong Wei, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 17/378,857

(22) Filed: Jul. 19, 2021

(65) Prior Publication Data

US 2022/0017704 A1 Jan. 20, 2022

Related U.S. Application Data (60) Provisional application No. 63/053,997, filed on Jul. 20, 2020.

(51) Int. Cl.
*C08K 5/14* (2006.01)
*C08J 3/24* (2006.01)
(Continued)

(52) U.S. Cl.
CPC .............. *C08J 3/247* (2013.01); *C08K 3/04* (2013.01); *C08K 5/0025* (2013.01); *C08K 5/14* (2013.01);
(Continued)

(58) Field of Classification Search
CPC ..... C08J 3/12; C08J 3/20; C08J 3/203; C08K 3/04; C08K 3/042; C08K 5/14; C08L 23/04; C08L 23/06; C08L 23/08; C08L 23/025
See application file for complete search history.

(56) References Cited

U.S. PATENT DOCUMENTS 7,906,053 B1  3/2011  Torkelson et al.
8,303,876 B1 * 11/2012  Torkelson ............. B29C 48/022
                                                        264/211.21
(Continued)

FOREIGN PATENT DOCUMENTS

CN          106867077        *  6/2017

OTHER PUBLICATIONS

Translation of CN 106867077 (Year: 2017).*
(Continued)

*Primary Examiner* — Robert C Boyle
(74) *Attorney, Agent, or Firm* — Bell & Manning, LLC (57) ABSTRACT

Methods for forming polyolefin nanocomposite precursor compositions are provided. In embodiments, such a method comprises mixing a polyolefin, unmodified graphite, and a peroxide crosslinker via solid-state shear pulverization under conditions to form a polyolefin nanocomposite precursor composition comprising the polyolefin; exfoliated, unmodified graphite dispersed throughout the polyolefin; and unreacted peroxide crosslinker dispersed throughout the polyolefin, wherein the polyolefin is polyethylene, a copolymer of polyethylene, or combinations thereof. Methods of forming crosslinked polyolefin nanocomposites, the polyolefin nanocomposite precursor compositions, and crosslinked polyolefin nanocomposites are also provided.

12 Claims, 8 Drawing Sheets

(51) Int. Cl.
*C08L 23/06* (2006.01)
*C08K 5/00* (2006.01)
*C08K 3/04* (2006.01)
*B82Y 30/00* (2011.01)
*B82Y 40/00* (2011.01)

(52) U.S. Cl.
CPC .............. *C08L 23/06* (2013.01); *B82Y 30/00* (2013.01); *B82Y 40/00* (2013.01); *C08K 2201/011* (2013.01); *C08L 2207/066* (2013.01); *C08L 2312/00* (2013.01)

(56) References Cited

U.S. PATENT DOCUMENTS

| | | | |
|---|---|---|---|
| 9,388,256 | B2 | 7/2016 | Torkelson et al. |
| 2015/0225491 | A1* | 8/2015 | Torkelson .................. C08F 8/14 525/387 |
| 2015/0232587 | A1* | 8/2015 | Torkelson .................. C08F 8/00 525/376 |

OTHER PUBLICATIONS

Zhang et al., "Suppression of space charge in crosslinked polyethylene filled with poly(stearyl methacrylate)-grafted SiO$_2$ nanoparticles," *Appl. Phys. Lett.* 110, 132903 (2017).

Wakabayashi, Katsuyuki, et al. "Solid-state shear pulverization as a real-world process for polymer blends and nanocomposites." Antec-Conference Proceedings-. vol. 3. 2007.

Dannenberg et al., "Peroxide Crosslinked Carbon Black Polyethylene Compositions," *Journal of Polymer Science*, vol. XXXI, pp. 127-153, (1958).

Sapieha et al., "Dicumyl Peroxide-Modified Celluslose/LLDPE Composites," *Journal of Applied Polymer Science*, vol. 41, 2039-2048 (1990).

Mokoena et al., "Composites of linear low density polyethylene and short sisal fibres: The effects of peroxide treatment," *Journal of Materials Science* 39 (2004) 3403-3412.

Wang et al., "Improved Self-Healing of Polyethylene/Carbon Black Nanocomposites by Their Shape Memory Effect," *The Journal of Physical Chemistry*, B 2013, 117, 1467-1474.

Jose et al., "Alumina-clay nanoscale hybrid filler assembling in cross-linked polyethylene based nanocomposites: mechanics and thermal properties", *Phys. Chem. Chem. Phys.* 2014, 16, 14730.

Razavi-Nouri et al., "Thermal, Tensile and rheological properties of dynamically cross-linked organoclay filled poly(ethylene-co-vinyl acetate)/acrylonitrile-butadiene rubber nanocomposites: Effect of peroxide content," *Polymer* 190 (2020) 122212.

Velasco et al., "Foaming behaviour and cellular structure of LDPE/hectorite nanocomposites," *Polymer* 48 (2007) 2098-2108.

Gul et al., "Flame-Retardant Synergism of Sepiolite and Magnesium Hydroxide in a Linear Low-Density Polyethylene Composite," *Journal of Applied Polymer Science*, vol. 121, 2772-2777 (2011).

Ben Aldrich, "Investigation of Solid-State Shear Pulverization Processing Parameters for Polyethylene-Clay Nanocomposites," (2011) *Honors Theses*. 41.

* cited by examiner

METHODS OF FORMING CROSSLINKED POLYOLEFIN NANOCOMPOSITES HAVING HIGH WEAR RESISTANCE

CROSS-REFERENCE TO RELATED APPLICATIONS

The present application claims priority to U.S. provisional patent application No. 63/053,997 that was filed Jul. 20, 2020, the entire contents of which are incorporated herein by reference.

BACKGROUND

Because of its many positive attributes, including flexibility, chemical resistance and low cost, low-density polyethylene (LDPE) is widely used for packaging and a range of industrial and medical applications, among others. However, due to its poor wear and abrasion resistance, the application of LDPE under continuous friction is limited. One possible solution is to incorporate rigid filler into neat LDPE matrix in order to improve the wear resistance.

However, the efforts to enhance the wear resistance of LDPE is limited because the incorporation of nanofiller can only result in LDPE composites with moderate wear resistance. Consequently, most studies aimed at achieving good wear resistance in polyethylene (PE)-based materials have focused on another form of PE, ultra-high molecular weight polyethylene (UHMWPE), which exhibits superior wear resistance even in the neat state. Because of its low friction coefficient, chemical stability and biocompatibility, UHMWPE has been used for tribological contact pairs applications, such as artificial joints. However, due to the presence of extremely long chains and ultra-high melt viscosity, the melt processability of UHMWPE is severely limited.

SUMMARY

Provided are methods for forming polymer nanocomposite precursor compositions and crosslinked polymer nanocomposites formed therefrom.

Methods for forming polyolefin nanocomposite precursor compositions are provided. In embodiments, such a method comprises mixing a polyolefin, unmodified graphite, and a peroxide crosslinker via solid-state shear pulverization under conditions to form a polyolefin nanocomposite precursor composition comprising the polyolefin; exfoliated, unmodified graphite dispersed throughout the polyolefin; and unreacted peroxide crosslinker dispersed throughout the polyolefin, wherein the polyolefin is polyethylene, a copolymer of polyethylene, or combinations thereof.

Methods of forming crosslinked polyolefin nanocomposites are also provided. In embodiments, such a method comprises subjecting a polyolefin nanocomposite precursor composition comprising a polyolefin; exfoliated, unmodified graphite dispersed throughout the polyolefin; and unreacted peroxide crosslinker dispersed throughout the polyolefin, wherein the polyolefin is polyethylene, a copolymer of polyethylene, or combinations thereof, to a melt processing technique under conditions to induce chemical reactions to crosslink chains of polyolefin, thereby forming a crosslinked polyolefin nanocomposite.

The polyolefin nanocomposite precursor compositions and crosslinked polyolefin nanocomposites are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIGS. 4A-4C show wear track profiles of LDPE samples.

FIGS. 6A-6B show the coefficient of friction in samples with various crosslinking density and filler loading.

DETAILED DESCRIPTION

Provided are methods for forming polymer nanocomposite precursor compositions and crosslinked polymer nanocomposites formed therefrom. The methods make use of solid-state shear pulverization (SSSP) to produce polymer nanocomposite precursor compositions exhibiting versatile melt processability. The precursor compositions may then be used to provide crosslinked polymer nanocomposites, including crosslinked low-density polyethylene (LDPE) nanocomposites, exhibiting surprisingly high wear resistance.

In embodiments, a method for forming a polymer nanocomposite precursor composition comprises mixing a polymer (e.g., a polyolefin), a nanoscale filler, (e.g., unmodified graphite), and a crosslinker (e.g., a peroxide) via SSSP. SSSP is a continuous processing technique which involves applying mechanical energy to a material (e.g., the polymer) in the solid state (i.e., at a temperature below the melting temperature of the polymer of the precursor composition). Existing solid-state shear pulverizers (e.g., see FIG. 1) may be used to carry out SSSP and parameters such as screw design, screw speed, barrel size, and feed rate may be adjusted to tune the conditions under which the mechanical energy is applied during SSSP. The SSSP is distinguished from melt mixing methods which involve processing the material/polymer in its molten state. The temperature used during SSSP is below the melting temperature of the polymer of the precursor composition. Thus, the temperature used depends upon the particular polymer. However, in embodiments, the temperature used is no more than 40° C., no more than 30° C., or about room temperature (20° C. to 25° C.). Similarly, the temperature is generally below the dissociation temperature of the crosslinker, e.g., the temperature at which the crosslinker dissociates into free radical-containing fragments. SSSP does not require any solvents; thus, the precursor composition is generally free of a solvent.

In the present methods, the SSSP conditions are selected so that two results are achieved. First, the unmodified graphite nanoscale filler is exfoliated and dispersed into the polyolefin matrix. This means that the layers of the unmodified graphite are separated and individual graphene nanoplatelets are homogeneously distributed throughout the polyolefin matrix. Confirmation of exfoliation and dispersal of unmodified graphite may be accomplished as described in the Example below, e.g., by using X-Ray diffraction (XRD) to confirm the absence of a diffraction peak at 26.5° (i.e., the normalized intensity at 26.5° is generally no greater than that shown in FIG. 2, bottom curve). More specifically, exfoliation and dispersal of unmodified graphite may be confirmed by having a value of the normalized intensity at 26.5° for the precursor composition that is within 5% of the value of the normalized intensity at 26.5° for the neat polyolefin only (i.e., no unmodified graphite and no crosslinker). SSSP conditions to achieve exfoliated and dispersed, unmodified graphite are described in the Example below.

Second, the peroxide crosslinker is dispersed (i.e., homogeneously distributed) into the polyolefin matrix without dissociating the peroxide into free radical-containing fragments or otherwise inducing chemical reactions to crosslink polyolefin chains. Thus, in the present methods, the mixing of the peroxide is carried out in the solid state (not the melt state) and retains the peroxide in its unreacted/undissociated form. This is different from the SSSP described in U.S. Pat. No. 9,388,256 in which benzoyl peroxide is intentionally dissociated into free radical-containing fragments during SSSP. The existence of unreacted peroxide (and the resulting lack of polyolefin crosslinking) may be confirmed using differential scanning calorimetry (DSC) as described in the Example, below. SSSP conditions to achieve dispersed and unreacted peroxide are described in the Example below. In addition, the peroxide may be added at a later stage to the solid-state shear pulverizer, i.e., after an initial mixing of the polyolefin and the unmodified graphite, to prevent its dissociation.

The result of mixing the polyolefin, the unmodified graphite, and the peroxide via SSSP as described above is a polymer nanocomposite precursor composition comprising the polyolefin; exfoliated, unmodified graphite dispersed throughout the polyolefin; and unreacted peroxide dispersed throughout the polyolefin. As further described below, this precursor composition has versatile melt processability and may be used to provide crosslinked polyolefin nanocomposites having surprisingly high wear resistance.

Although other polymers may be used, generally, the polymer of the polymer nanocomposite precursor composition is a polyolefin. The polyolefin may be a homopolymer or a copolymer. Polyethylene and polyethylene copolymers may be used. Combinations of different types of polyolefins may be used. In embodiments, the polyolefin is low-density polyethylene (LDPE) having a density in a range of rom 0.910 g/cm$^3$ to 0.940 g/cm$^3$. The polyolefin generally comprises the bulk of the precursor composition, with the amounts of unmodified graphite and unreacted crosslinker as described below.

Although other nanoscale fillers may be used, generally, the nanoscale filler of the polymer nanocomposite precursor composition is unmodified graphite. The term "unmodified" means that the graphite that is used in the present methods is as received, without any pretreatment, as described in the Example below. The unmodified graphite is exfoliated and dispersed as described above. The amount of the unmodified graphite in the precursor composition may be selected to achieve a desired property, e.g., maximum wear resistance. Illustrative amounts include from 0.1 weight % to 10 weight %, from 1 weight % to 7 weight %, and from 2 weight % to 5 weight %. (The term "weight %" refers to the weight of the unmodified graphite relative to the total weight of the precursor composition.) In embodiments, no other filler is used in the precursor composition other than the unmodified graphite.

Although other crosslinkers may be used (provided the crosslinker is one capable of inducing chemical reactions to crosslink polymer chains), in embodiments, the crosslinker of the polymer nanocomposite precursor composition is a peroxide. As noted above, the peroxide is in its unreacted form. This means that all the peroxide in the precursor composition is in its unreacted form or that the amount of dissociated peroxide/free radical-containing fragments is too small to have a material effect. Similarly, all the polyolefin in the precursor composition is in its uncrosslinked form (i.e., all or an amount of crosslinked polyolefin too small to have a material effect). Peroxides having high dissociation temperatures (temperature at which the peroxide dissociates into free radical-containing fragments) may be used. Illustrative such peroxides include dicumyl peroxide; cumene hydroperoxide; t-butyl peroxide; 2,5-Bis(tert-butylperoxy)-2,5-dimethylhexane; 2,5-Bis(tert-butylperoxy)-2,5-dimethyl-3-hexyne; and Bis[1-(tert-butylperoxy)-1-methylethyl]benzene. The amount of the peroxide in the precursor composition may be selected to achieve a desired property, e.g., maximum wear resistance. Illustrative amounts include from 0.1 weight % to 10 weight %, from 1 weight % to 7 weight %, and from 2 weight % to 5 weight %. (The term "weight %" refers to the weight of the peroxide relative to the total weight of the precursor composition.)

Although additives may be included in the polymer nanocomposite precursor composition, in embodiments, the precursor composition consists of the polyolefin, the unmodified graphite, the unreacted peroxide, and optionally, one or more of a dye, a preservative, and an antioxidant.

Figure 7:
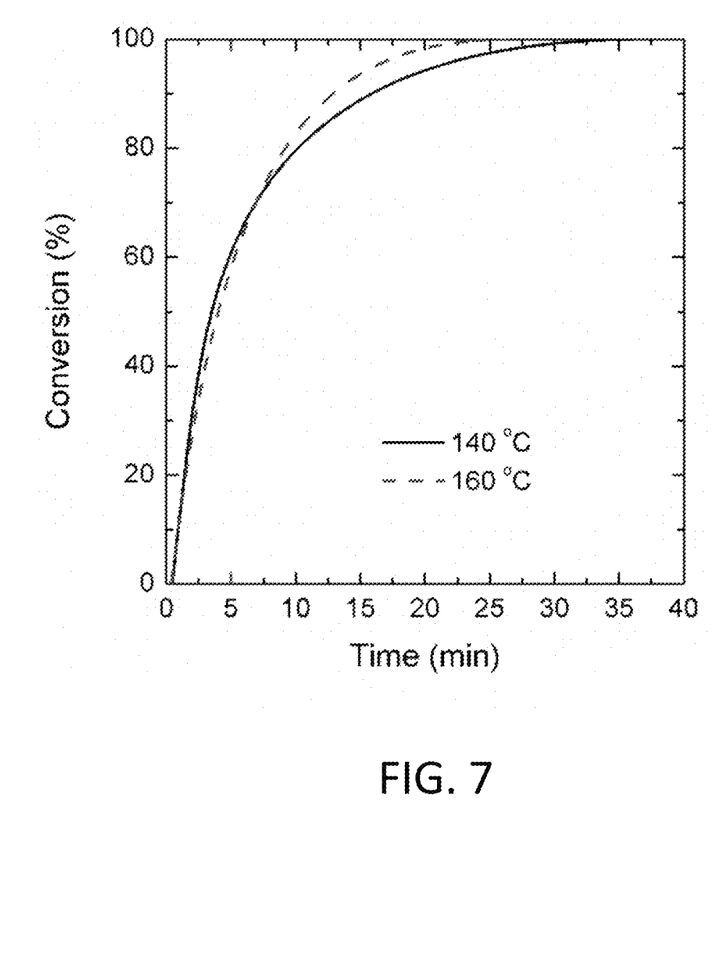
FIG. 7 shows conversion of crosslinking reaction under isothermal condition monitored by differential scanning calorimetry.

Crosslinked polymer (e.g., polyolefin) nanocomposites may be formed by subjecting any of the disclosed polymer nanocomposite precursor compositions to a melt processing technique under conditions to induce chemical reactions to crosslink polyolefin chains (i.e., to induce curing). A variety of existing melt processing techniques may be used, including compression molding, rotational molding, melt extrusion, injection molding, and powder coating. The conditions may be selected to achieve a desired degree (e.g., maximum) of crosslinking. For example, DSC may be used to confirm that the conditions fully convert the precursor composition to its crosslinked/cured state as described in the Example below. (See FIG. 7; 100% conversion is full conversion and is indicative of maximum crosslinking.)

The crosslinked polymer nanocomposites may be characterized by a variety of properties including non-isothermal crystallization onset temperature ($T_{c,\ onset}$), percent crystallinity, Young's modulus, ultimate strength, elongation at break, and wear resistance as described in the Example below. However, as noted above, embodiments of the crosslinked polymer nanocomposites are characterized by surprisingly high wear resistance. Wear resistance may be quantified by a reduction in wear volume as compared to that of a comparative material. By "comparative material" it is meant one formed using the same melt processing technique and conditions as the crosslinked polymer nanocomposite and from the same precursor composition except free of the nanoscale filler and free of the crosslinker. For example, a crosslinked LDPE nanocomposite comprising crosslinked LDPE and exfoliated, unmodified graphite dispersed therein may be compared against neat LDPE which has been subjected to the same melt processing technique/conditions used to form the crosslinked LDPE nanocomposite. The tribology tests described in the Example below may be used to determine reduction in wear volume. In embodiments, the crosslinked polymer nanocomposite is characterized by a reduction in wear volume of at least 80%, at least 85%, or at least 90% as compared to a comparative material. (See FIGS. 4B and 5.)

Example

Introduction

In this Example, the synergistic effects of crosslinking and filler loading on wear resistance enhancement in crosslinked LDPE/graphite nanocomposites was demonstrated. Solid-state shear pulverization (SSSP) was used to prepare crosslinked nanocomposite powder precursor containing as-received graphite and undissociated dicumyl peroxide (DCP). SSSP is a tunably mild, continuous and scalable technique that processes material in the solid state. The pulverizer is a modified twin-screw extruder equipped with a cooling system to maintain the barrel temperature below the melting temperature of semi-crystalline polymer. During processing, the pulverizer provides effective size reduction of filler aggregates and polymer powders, along with intimate mixing between components. The LDPE/graphite nanocomposite powder precursor is further consolidated and crosslinked by melt processing. The precursor powder containing well-dispersed, unreacted DCP has versatile melt processability with techniques ranging from compression molding and rotational molding to melt extrusion and injection molding. In stark contrast, mixing organic peroxide in the molten state via conventional melt processes, e.g., melt extrusion or batch melt mixing, limits the further melt processability. This is believed to be due to crosslinks developed during the mixing step.

Graphite was selected as the nanofiller. Some studies have used graphite or graphene as filler to improve wear performance of nanocomposites, but pre-modification has been used. For example, synthetic steps have been used to chemically treat the graphite in order to introduce functional groups, e.g., alkyl, onto the surface thereof. In contrast, SSSP is used to significantly exfoliate as-received (unmodified) graphite into nanoplatelets containing several to ~30 graphene layers and effectively disperse the nanoplatelets into the polymer matrix. The crosslinking degree is tuned by the amount of DCP incorporated during SSSP prior to melt processing. This Example reports the wear rate of crosslinked LDPE/graphite nanocomposites made by SSSP as a function of filler loading and crosslinking degree. The uniaxial tensile properties and non-isothermal crystallization behavior of these nanocomposites is also reported.

EXPERIMENTAL

Materials

Low density polyethylene was provided by Exxon-Mobil (density=0.919 g/cm$^3$, MFI=1.1 g/10 min at 190° C.) and used as received. Dicumyl peroxide and ultra-high molecular weight polyethylene ($M_w$=3,000-6,000 kg/mol as reported by the supplier) was purchased from Sigma-Aldrich and used as received. As-received graphite was provided by Asbury Carbon (average flake diameter=2 surface area=113 m$^2$/g, as reported by the supplier) and used without pretreatment.

Preparation of LDPE/Graphite Nanocomposites Powder Precursor

Figure 1:
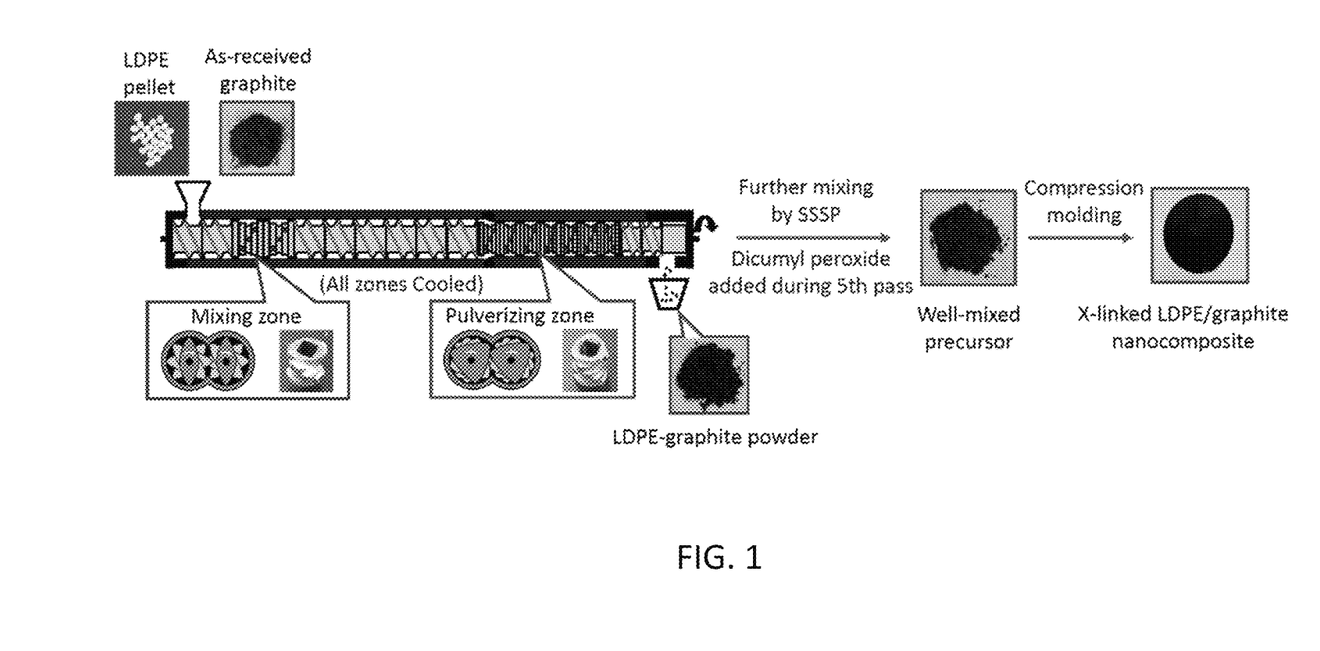
FIG. 1 shows a schematic representation of two-step process combining SSSP and compression molding to prepare well-mixed crosslinked LDPE/graphite nanocomposites.

Solid-state shear pulverization was employed to prepare well-dispersed and well-exfoliated LDPE/graphite nanocomposite precursor powder, as shown in FIG. 1. The pulverizer is a modified twin-screw extruder (Berstorff ZE-25) cooled by recirculating an ethylene glycol/water mix at 7° C. (Budzar Industries WC-3 chiller). Pellets of LDPE were continuously fed into the pulverizer via a pellet feeder (K-tron S-60) at 100 g/h. As-received graphite was added via a powder feeder (Brabender Technology Inc. DDSR12-1 volumetric feeder) at a feeding rate depending the desired filler level (1-7 wt %) in the final nanocomposites. The LDPE pellets and graphite were processed at 200 rpm screw speed using a harsh screw design to achieve high levels of filler dispersion. (See P. J. Brunner, et al., Polym. Eng. Sci. 2012; 52: 1555 for detailed screw design and energy input information.) The powder mixture output was further processed for another four times via SSSP to achieve extensive graphite exfoliation and dispersion. The DCP was added only in the final pass, which suppresses/prevents any mechanochemical decomposition of the DCP resulting from shear forces. 1 or 3 wt % of DCP relative to LDPE in the nanocomposite was added in order to maintain the same crosslinking density regardless of graphite content.

Preparation of Linear or Crosslinked LDPE/Graphite Nanocomposites Via Compression Molding LDPE/graphite nanocomposites powder was consolidated into sheets by compression molding. Powder precursor was pressed into a disc using a press. The disc was further sandwiched between Kapton films and compression molded into a sheet (~1 mm thick) using a PHI (mold 0230 C-X1) press at 160° C. for 30 min with a 10-ton ram force followed by immediately cooling in a cold press at 10° C. under 10-ton ram force. The crosslinking reaction induced by DCP is completed at 160° C. for 30 min as monitored by differential scanning calorimetry (DSC); see FIG. 7. To measure conversion, the isothermal curing experiments were conducted by holding the sample at 140° C. or 160° C. The heat flow was recorded as a function of time. The conversion of reaction was calculated by integration of reaction heat at a given time divided by the total heat during reaction. The heat of reaction during curing was 14.5 mJ/mg in the 3DCP-LDPE sample.

Characterization of LDPE/Graphite Nanocomposites

The crystallization behavior of LDPE/graphite nanocomposites was characterized using a Mettler-Toledo differential scanning calorimeter (DSC 822e). The non-isothermal crystallization onset temperature ($T_{c,onset}$) was obtained using a 10° C./min cooling ramp from above the melt temperature. The percentage crystallinity was determined by dividing the sample enthalpy of fusion by the enthalpy of fusion for 100% crystalline PE (285.9.1 J/g).

Uniaxial tensile testing samples were cut from sample sheets using a Dewes-Gimbs die. Samples were equilibrated at room temperature for 48 h and then tested (ASTM D1708) using an MTS Sintech 2S tensile tester equipped with 5 kN load cell at a cross head speed of 50 mm/min. At least five specimens were tested for each sample.

X-ray diffraction was performed on a STOE-STADI-P diffractometer, operating with a Cu Kα radiation at 40 kV and 40 mA on ~1 mm thick compression molded films or graphite powder.

A reciprocal ball-on-disk tribometer (Rtec MFT-5000) was used to investigate the wear resistance of LDPE/graphite nanocomposites. Nanocomposite sheets were taped onto glass substrates. Tribological tests were carried out at a load of 5 N and a frequency of 3 Hz. The sliding distance was 7.2 mm per cycle. The ball is AISI 316 stainless steel with a diameter of 0.25 inch. A virgin stainless steel ball was mounted before each test. Each test was conducted for 1 hr at room temperature and humidity without any lubrication. Samples were rinsed with ethanol to remove the wear debris after tribological tests. The depth profile of the wear track was obtained via a 3D laser confocal optical microscope (Olympus OLS5000), thus allowing determination of the wear volume. The depth profile of the wear track cross section was averaged over 300 μm in length along the wear direction.

Results and Discussion

Filler Dispersion in LDPE/Graphite Hybrids and Nanocomposites (without Crosslinking) Determined by X-Ray Diffraction (XRD)

Figure 2:
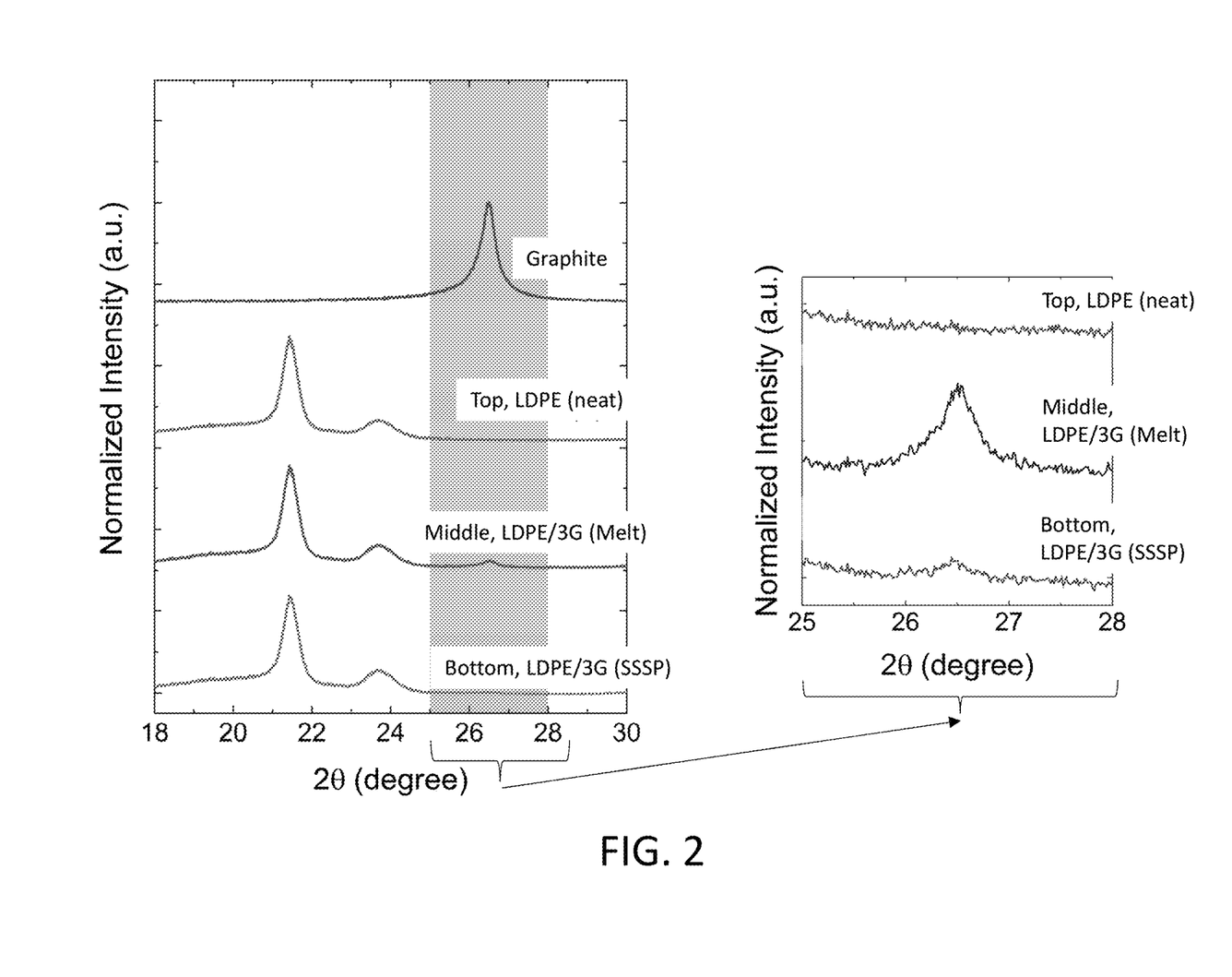
FIG. 2 shows X-ray diffraction data of as-received graphite, (top) neat LDPE, (middle) LDPE/3G hybrid prepared by melt mixing in a cup-and-rotor mixer and (bottom) LDPE/3G nanocomposites prepared SSSP. The intensities of neat LDPE and hybrids were normalized by making the area associated with PE crystal peaks equal. The highlighted area and inset are the area containing the characteristic diffraction peaks corresponding to unexfoliated graphite.

XRD was used to reveal the macroscopic extent of as-received graphite exfoliation in the LDPE/graphite nanocomposites. FIG. 2 shows the XRD data for as-received graphite, neat LDPE (top), LDPE/3G (middle, 3G refers to the 3 wt % of graphite relative to LDPE) hybrid prepared by melt mixing in a cup-and-rotor mixer, and LDPE/3G nanocomposite prepared by SSSP (bottom). The data for neat LDPE and hybrids were normalized by making the areas associated with PE crystal peaks equal. (Neat LDPE and the LDPE hybrids and nanocomposites have the same crystallinity within experimental error as determined by DSC.) As-received graphite exhibits a diffraction peak at 2θ=26.5°, corresponding to an average interlayer spacing (d-spacing) of 0.336 nm according to Bragg's law. This value is in excellent accord with the d-spacing of natural graphite (0.335 nm, B. T. Kelly, *Physics of Graphite*, Applied Science: London, 1981.). Neat LDPE and the hybrid/nanocomposites exhibit peaks at 2θ=21.3° and 2θ=23.7°, corresponding to the diffracted X-ray intensity from (110) and (200) planes, respectively (S. Aggarwal, et al., J. Polym. Sci. 1955; 18: 17.). The inset of FIG. 2 shows the XRD data for neat LDPE and LDPE hybrid/nanocomposite in the 2θ range of 25° to 28°. Neat LDPE exhibits essentially no diffraction peak in this region. The LDPE/3G hybrid prepared by melt mixing exhibits a sharp peak associated with graphite. Thus, the relatively weak shear forces provided by conventional melt mixing are insufficient to substantially exfoliate as-received graphite in the LDPE matrix. In contrast, the LDPE/3G nanocomposite prepared via SSSP exhibits a very strongly suppressed X-ray peak associated with unexfoliated graphite. These results indicate that very substantial levels of graphite exfoliation are achieved during SSSP. As this graphite exfoliation achieved by SSSP occurs prior to any crosslinking, the highly exfoliated state of the nanocomposites should be retained after compression molding the nanocomposites containing DCP, leading to crosslinked LDPE/graphite nanocomposites.

Crystallization Behavior of LDPE/Graphite Nanocomposites Prepared by SSSP (with and without Crosslinking)

Figure 3:
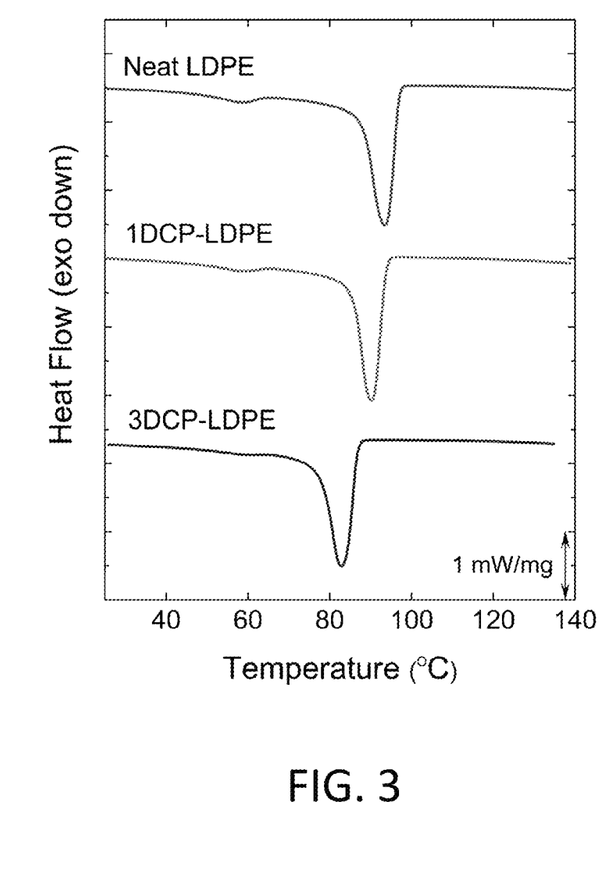
FIG. 3 shows non-isothermal crystallization curves (obtained upon cooling) for neat LDPE and 1DCP-LDPE and 3DCP-LDPE prepared by SSSP. (Cooling ramp is 10° C./min.)

FIG. 3 and Table 1 show the non-isothermal crystallization behaviors of neat LDPE, 1DCP-LDPE, 3DCP-LDPE (1DCP and 3DCP refers to 1 wt % and 3 wt % of DCP relative to LDPE, respectively) and corresponding nanocomposites containing 1 to 7 wt % graphite. Crystallization onset temperature ($T_{c,onset}$) and crystallinity were obtained from DSC measurements taken upon cooling from the melt at a 10° C./min cooling rate. 1 wt % and 3 wt % DCP relative to LDPE is incorporated during SSSP to yield lightly crosslinked 1DCP-LDPE and highly crosslinked 3DCP-LDPE, respectively. 1DCP-LDPE and 3DCP-LDPE exhibit $T_{c,onset}$ values that are 3° C. and 10° C. lower than that of neat LDPE, as shown in FIG. 3. The mobility of crosslinked LDPE in the molten state is restricted by the permanent crosslinks. As a result, those restricted polymer chains lead to lower $T_{c,onset}$ values. The crystallinities of 1DCP-LDPE and 3DCP-LDPE are 3% and 6% lower than that of neat LDPE, respectively. These reductions are consistent with the notion that that the ethylene repeat units closest to the crosslinks are not able to fold into lamella. Thus, higher crosslinking density leads to lower crystallinity in these crosslinked LDPE materials.

TABLE 1

Crystallization behavior of neat LDPE and LDPE/graphite nanocomposites prepared by SSSP.

| Filler content wt (%) | LDPE | | 1DCP-LDPE[a] | | 3DCP-LDPE[a] | |
|---|---|---|---|---|---|---|
| | $T_{c,onset}$ (° C.) | Crystallinity[b] (%) | $T_{c,onset}$ (° C.) | Crystallinity[b] (%) | $T_{c,onset}$ (° C.) | Crystallinity[b] (%) |
| 0 | 97 | 44 | 94 | 41 | 87 | 38 |
| 1 | 101 | 43 | 96 | 40 | 89 | 37 |
| 3 | 101 | 44 | 98 | 40 | 90 | 37 |
| 5 | 101 | 42 | 99 | 40 | 92 | 37 |
| 7 | 101 | 42 | 99 | 40 | 92 | 37 |

[a]1DCP and 3DCP refers to 1 wt % and 3 wt % of DCP relative to LDPE, respectively.
[b]Crystallinity refers to the PE percentage crystallinity determined upon cooling from the melt at a 10° C./min cooling rate.

As shown in Table 1, all LDPE/graphite nanocomposites exhibit essentially the same crystallinity as the neat LDPE matrix or DCP-LDPE material within a small error. The addition of 1 wt % well exfoliated graphite in LDPE leads to a 4° C. increase in $T_{c,onset}$ values. This is because the well-exfoliated nanofiller with enormous surface-to-volume ratio can serve as effective heterogeneous nucleation agents for LDPE crystallization. With increasing filler content, the $T_{c,onset}$ values of LDPE/graphite nanocomposites remain invariant. This is due to the fact that LDPE is a highly crystallizable semi-crystalline polymer, and a certain degree of supercooling is required for the formation and growth of crystallites. In contrast, $T_{c,onset}$ values of 1DCP-LDPE/ graphite nanocomposites increased gradually from 96° C. to 99° C. with increasing filler loading. Similar behavior is observed in 3DCP-LDPE/graphite nanocomposites. The crosslinkers restrict the chain mobility and thus 1DCP-LDPE and 3DCP-LLDPE are less crystallizable than neat LDPE. The presence of heterogeneous nucleation sites facilitates the formation and growth of crystallites. As a result, the $T_{c,onset}$ values of crosslinked LDPE nanocomposites increase with increasing amounts of heterogeneous nucleation sites.

Uniaxial Tensile Behavior of LDPE/Graphite Nanocomposites

Table 2 shows the uniaxial tensile properties of LDPE/ graphite nanocomposites as a function of filler loading and crosslinking density. The Young's modulus of neat LDPE and 1DCP-LDPE are the same within experimental error. In semi-crystalline PE, the Young's modulus of crystalline phase is on the order of ~200 GP, and the apparent Young's modulus of LDPE decrease with decreasing crystallinity. (See I. Sakurada, et al., J. Polym. Sci. 1962; 57: 651. J. Clements, et al., Polymer 1978; 19: 639, and J. Halpin, et al., J. Appl. Phys. 1972; 43: 2235.) On the other hand, according to ideal rubber elasticity theory, the Young's modulus of crosslinked polymer scales linearly with crosslinking density (P. J. Flory, *Principles of Polymer Chemistry*, Cornell University Press: Ithaca, N.Y., 1953). In lightly crosslinked 1DCP-LDPE, the introduction of crosslinks compensates the slightly lowered crystallinity relative to neat LDPE, leading to invariant Young's modulus. Although 3DCP-LDPE has higher crosslinking density, the Young's modulus is reduced by 48% relative to the neat LDPE due to lower crystallinity and thinner lamella structure. Relative to neat LDPE, 1DCP-LDPE and 3DCP-LDPE, at 7 wt % graphite content, the Young's moduli of the nanocomposites was enhanced by 62%, 82% and 82%, respectively.

TABLE 2

Uniaxial tensile properties of PE/graphite nanocomposites.

| Sample name [a] | Young's modulus (MPa) | Ultimate strength (MPa) | Elongation at break (%) |
| --- | --- | --- | --- |
| LDPE | 210 ± 20 | 8.8 ± 0.3 | 660 ± 40 |
| LDPE/1G | 270 ± 10 | 9.3 ± 0.5 | 530 ± 80 |
| LDPE/3G | 290 ± 20 | 9.9 ± 0.2 | 550 ± 70 |
| LDPE/5G | 310 ± 20 | 9.8 ± 0.4 | 460 ± 30 |
| LDPE/7G | 340 ± 30 | 10.3 ± 0.2 | 410 ± 30 |
| 1DCP-LDPE | 220 ± 10 | 18.2 ± 1.6 | 650 ± 40 |
| 1DCP-LDPE/1G | 240 ± 10 | 18.9 ± 0.5 | 610 ± 20 |
| 1DCP-LDPE/3G | 270 ± 20 | 18.7 ± 1.6 | 630 ± 40 |
| 1DCP-LDPE/5G | 280 ± 10 | 16.6 ± 0.6 | 560 ± 30 |
| 1DCP-LDPE/7G | 300 ± 20 | 15.1 ± 1.1 | 470 ± 70 |
| 3DCP-LDPE | 110 ± 20 | 15.1 ± 1.3 | 420 ± 30 |
| 3DCP-LDPE/1G | 150 ± 20 | 15.7 ± 1.5 | 380 ± 30 |
| 3DCP-LDPE/3G | 150 ± 10 | 17.2 ± 0.7 | 400 ± 20 |
| 3DCP-LDPE/5G | 160 ± 20 | 18.7 ± 1.9 | 450 ± 50 |
| 3DCP-LDPE/7G | 200 ± 30 | 18.3 ± 2.6 | 470 ± 60 |

[a] LDPE/1G refers to 1 wt % of graphite relative to LDPE. 1DCP and 3DCP refers to 1 wt % and 3 wt % of DCP relative to LDPE, respectively.

The elongation of break is reduced from 660% in neat LDPE to 420% in 3DCP-LDPE (without any filler). The incorporation of chemical crosslinks imposes the restriction of chain mobility during deformation, reducing the probability of chain slipping. As a result, the elongation of break in highly crosslinked 3DCP-LDPE is mainly determined by the average stretchability of chains between the chemical crosslinks. The ductility of lightly crosslinked 1DCP-LDPE is the same as neat LDPE within error due to the low degree of crosslinking density. The incorporation of rigid nanofiller in neat LDPE is expected to reduce the ductility due to the defects caused by filler agglomerates. For example, the elongation of break is reduced from 660% in neat LDPE to 460% in LDPE/5G nanocomposites. Even at 7 wt % graphite loading with 38% reduced elongation at break relative to neat LDPE, the nanocomposites still remain ductile. In contrast, the elongation at break in 3DCP-LDPE/graphite nanocomposites remain invariant with increasing filler loading within error. Due to the restricted mobility imposed by chemical crosslinks, the elongation of break of 3DCP-LDPE/graphite nanocomposites is mainly determined by the ductility of matrix polymer. Thus, the defects caused by nanofiller aggregates will not significantly affect the elongation at break, even at 7 wt % filler loading.

Wear Resistance of LDPE/Graphite Nanocomposites

Figure 4A:
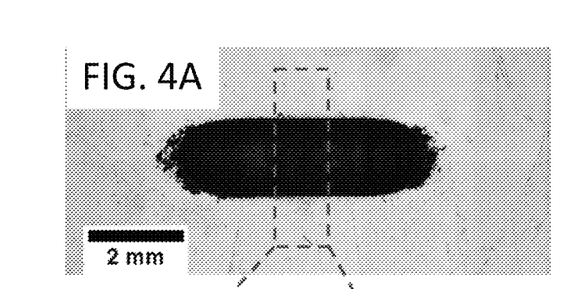
FIG. 4A is a 2D top view of wear track on neat LDPE.
Figure 4B:
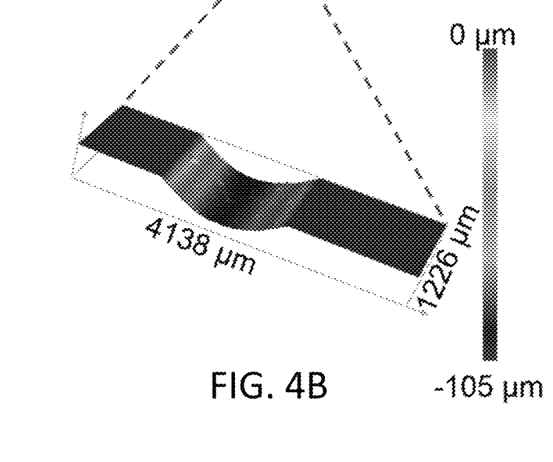
FIG. 4B is a 3D view of wear track on neat LDPE obtained via a 3D laser confocal microscope.
Figure 4C:
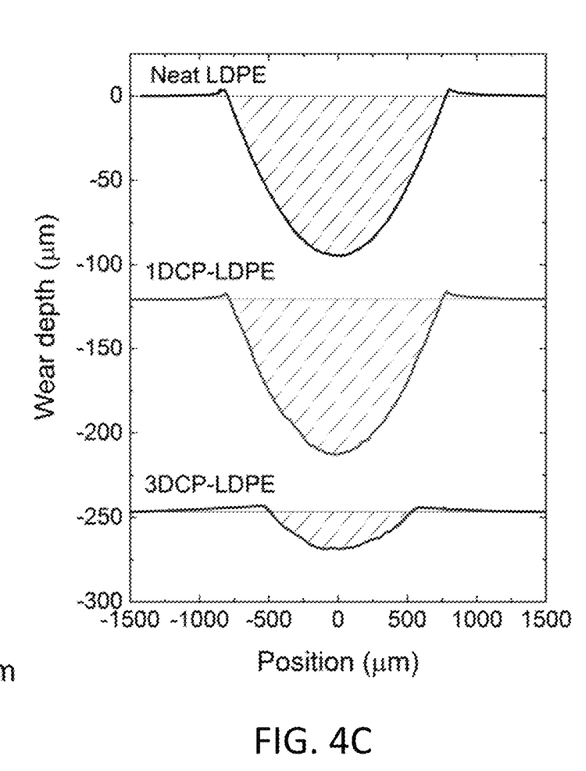
FIG. 4C is the depth profile of the wear tracks cross section (averaged over 300 μm in length along the wear direction). The curves have been arbitrarily shifted vertically for clarity. The hatched region in the profile is taken as cross section area for wear volume calculation.

Wear track profiles were obtained using a 3D laser confocal optical microscope, with representative results shown in FIGS. 4A-4C. FIG. 4A presents the top view image of a wear track on neat LDPE after the tribology test. The round edges at the end of wear track were excluded for wear volume calculation; only the middle section (4 mm in length along the wear direction) was used. Scanning the wear track over a 4138 µm×1226 µm area in the middle results in the 3D depth profile shown in FIG. 4B. FIG. 4C shows the wear track depth profile averaged over 300 µm in length along the wear direction in neat LDPE, 1DCP-LDPE and 3DCP-LDPE samples. The hatched region in the profile is taken as the average cross section area for wear volume calculation.

Figure 5:
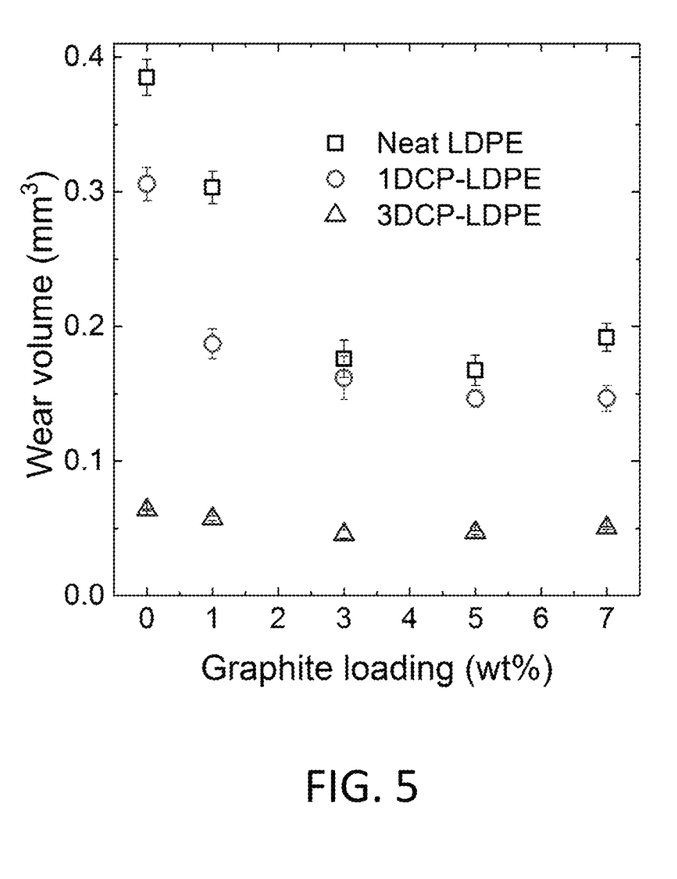
FIG. 5 shows wear volume of the wear tracks in LDPE, 1DCP-LDPE (lightly crosslinked) and 3DCP-LDPE (highly crosslinked) as a function of filler loading. The error bar is associated with the standard deviation of three measurements.

FIG. 5 shows the wear volume of samples as a function of graphite loading and crosslinking degree calculated using the cross-section profiles determined above. Relative to neat LDPE, lightly crosslinked 1DCP-LDPE and highly crosslinked 3DCP-LDPE (without filler) exhibit 20% and 83% reductions in wear volume, respectively. The enhancement of wear performance can be attributed to additional chemical crosslinks relative to neat LDPE. The low degree of physical crosslinks in LDPE leads to accelerated abrasive wear involving removal of submicron particles from the contacting surfaces under wear conditions. Highly crosslinked LDPE is analogous to PE with infinitely high molecular weight. These chemical crosslinks can effectively compensate for the insufficient physical crosslinks and significantly enhance the wear resistance. The incorporation of well-dispersed graphite significantly reduces the wear volume in nanocomposites up to 3 wt % loading. For instance, LDPE/ 3G, 1DCP-LDPE/3G and 3DCP-LDPE/3G exhibits 54%, 47% and 28% reduced wear volume relative to corresponding neat matrices, respectively. This behavior can be rationalized by the fact that graphite is a self-lubricating material, the inter-layer sliding motion of graphite nanoplates containing several to ~30 graphene layers during the tribology test could significantly enhance the wear performance of nanocomposite materials. The large interfacial area between the PE matrix and the well-dispersed graphene nanoplatelets provides strong polymer-filler interactions, which facilitate the stress transfer to the filler network. Better stress transfer to filler during the sliding motion could effectively improve the wear resistance of graphene nanocomposites relative to the neat polymer matrices. The reduced wear volume can also be attributed to the enhanced mechanical properties of nanocomposites relative to neat PE matrices. As shown in Table 2, LDPE/3G, 1DCP-LDPE/3G and 3DCP-LDPE/3G exhibits Young's modulus values that are 38%, 23% and 36% higher than corresponding neat matrices, respectively.

Although not directly measured, the shear modulus is also enhanced as observed by the enhanced Young's modulus. The nanocomposites exhibit a reduction of shear deformation relative to neat PE matrices, resulting in fewer PE chains abraded from the contacting area. A further increase of graphite from 3 wt % to 7 wt % does not reduce wear volume within error. This behavior may be explained by that fact that filler dispersion quality may not be maintained at a constant level at a higher filler loading level.

Figure 8:
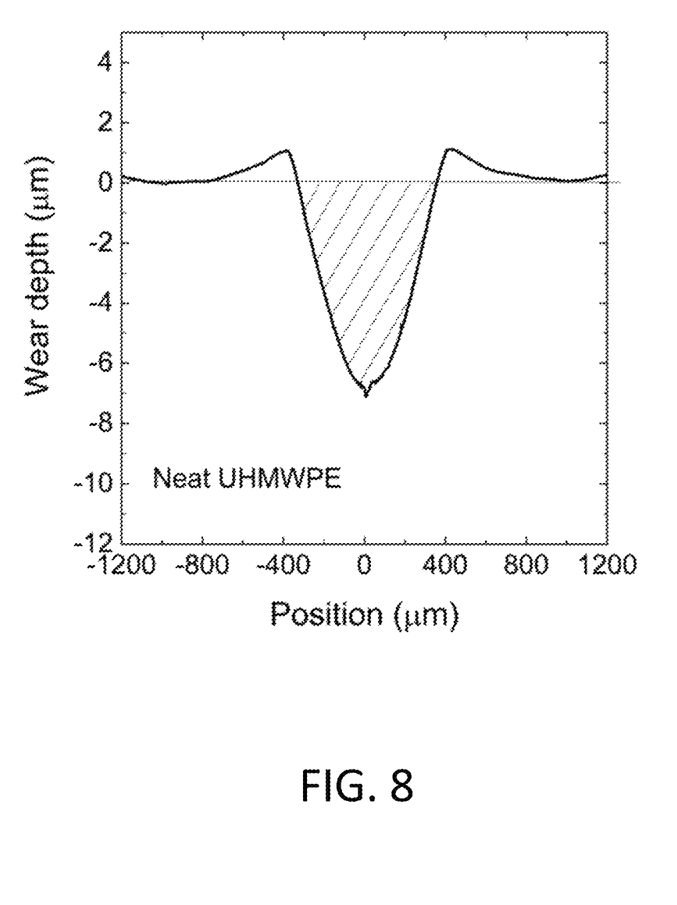
FIG. 8 shows the depth profile of the wear track cross section in a neat commercial UHMWPE (averaged over 300 μm in length along the wear direction). The hatched region in the profile is taken as cross section area for wear volume calculation.

The incorporation of the combination of chemical crosslinks and well-dispersed graphite substantially enhances the wear resistance of the crosslinked LDPE nanocomposites relative to neat LDPE. The strengths of these two factors were further compared. LDPE/3G (without crosslinks) exhibits a wear volume of 0.18 mm$^3$, 54% less than that of neat LDPE, after the tribology test. In stark contrast, crosslinked 3DCP-LDPE (without the incorporation of any graphite) has a wear volume of only 0.06 mm$^3$, 83% less than that of neat LDPE. These results indicate that chemical crosslinks play a stronger role than nanofiller in reducing the wear volume. This may be rationalized from the notion that changing the PE architecture from poorly entangled neat LDPE to covalently crosslinked LDPE, the wear resistance will be strongly enhanced because the LDPE makes up the vast majority of the nanocomposite material. In contrast, graphite filler makes up only a few wt % of the nanocomposites and can only lubricate the counterface and alleviate the wear damage. In the optimum circumstance encountered here, 3DCP-LDPE with 3 wt % or higher graphite filler loading exhibits a wear volume reduction of ~88% relative to neat LDPE. Notably, a commercial UHMWPE sample (3,000-6,000 kg/mol reported by supplier), which is expected to have a vastly improved wear resistance relative to neat LPDE, exhibits a wear volume that is a factor of 3.5 smaller than that of 3DCP-LDPE/3G crosslinked nanocomposite under the same experimental conditions. (See FIG. 8 for depth profile of the wear track cross section.) Moreover, in comparison with UHMWPE, the nanocomposite powder precursors provide much more versatile melt processability into final products, including extrusion, injection molding, powder coating and rotational molding.

Figure 6A:
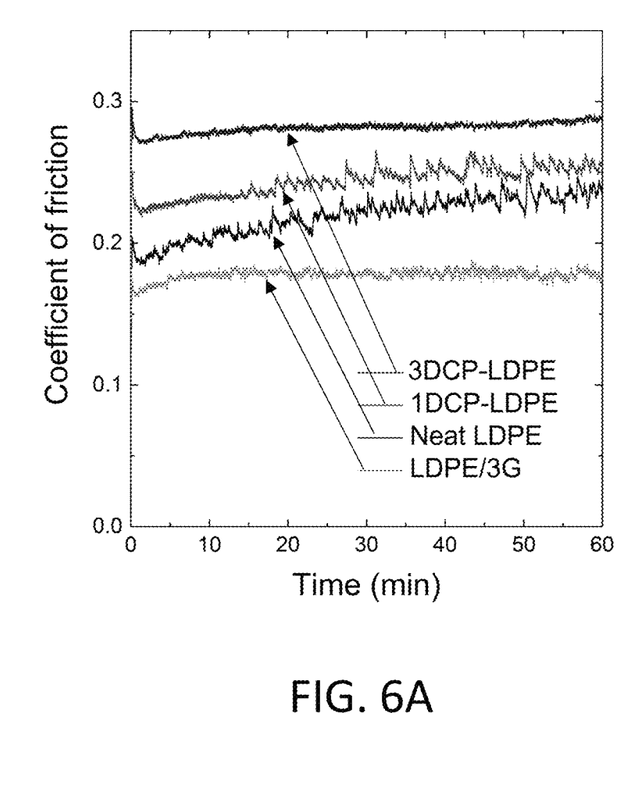
FIG. 6A shows the variation of coefficient of friction as a function of time in neat LDPE, 1DCP-LDPE (lightly crosslinked) and 3DCP-LDPE (highly crosslinked).

FIG. 6A shows the variation of coefficient of friction (COF) during wear tests in neat LDPE, 1DCP-LDPE, 3DCP-LDPE and LDPE/3G. The COF was averaged over the data range after 10 min to avoid the large variation in the initial "break-in" stage. It is noted that there is a minor increase of COF in neat LDPE and 1DCP-LDPE as a function time. This behavior could be due to the fact that the contacting area between the stainless-steel ball and sample surface increases with increasing wear track depth, leading to larger frictional forces along the sliding direction and a higher COF. Such an increase is negligible in 3DCP-LDPE because the wear track is much shallower as compared to neat LDPE and 1DCP-LDPE.

As shown in FIG. 6A, the COF increases with increasing crosslinking degree. For instance, the average COF increased from 0.23 in neat LDPE to 0.28 in 3DCP-LDPE. This phenomenon has been previously observed in crosslinked HDPE with the COF increasing with increasing crosslink density. Under the constant sliding motion of metal balls against the polymer surface, a transfer film of polymer powder would form to shield the soft polymer from the counterface. As most polymers are self-lubricating materials, the transfer layer serves as a lubricant to reduce the COF. Such a transfer layer was observed in neat linear HDPE supported by a layer of HDPE deposited on the metal surface. However, no transfer film was observed in crosslinked HDPE. As a result, the metal ball directly rubs against the crosslinked HDPE, leading to a higher COF relative to linear HDPE. These results are sufficient to explain the larger COF in LDPE with higher crosslinking degree in this current study. The incorporation of 3 wt % well-dispersed graphite in neat LDPE led to COF reduction from ~0.23 to ~0.18. The existence of self-lubricating graphite in the transfer layer could effectively reduce the COF in LDPE/graphite nanocomposites.

Figure 6B:
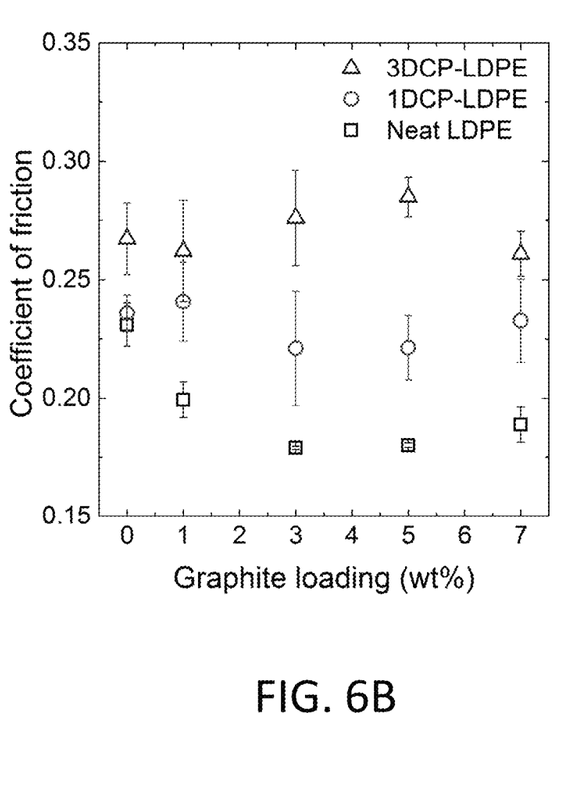
FIG. 6B shows the average coefficient of friction value over the entre duration of the test in LDPE, 1DCP-LDPE and 3DCP-LDPE with various filler loading. The error bar is associated with the standard deviation of three measurements.

FIG. 6B shows the average COF of LDPE/graphite nanocomposites as a function of crosslinking density and graphite loading. In LDPE/graphite nanocomposite, the COF decreases with increasing filler loading. In stark contrast, the addition of graphite does not impact the COF in 1DCP-LDPE/graphite and 3DCP-LDPE/graphite nanocomposites, within error. As described earlier, the transfer layer in neat LDPE serves as a lubricant to reduce COF during tribology tests. The lower COF of LDPE/graphite nanocomposites indicates a reduced abrasive wear relative to neat LDPE, in accordance with the enhanced wear performance. However, in 1DCP-LDPE/graphite and 3DCP-LDPE/graphite nanocomposites, the stainless ball directly rubs against the sample in the absence of a transfer layer. The existence of graphite does not effectively lubricate the wear track, leading to a COF that is invariant in crosslinked nanocomposites relative to corresponding neat matrices.

CONCLUSIONS

Crosslinked LDPE nanocomposite precursors containing as-received graphite were prepared via SSSP with up to 7 wt % filler and up to 3 wt % crosslinking agent, dicumyl peroxide. The powder precursors were further consolidated and cured in the molten state by compression molding. X-ray diffraction results revealed high levels of graphite exfoliation achieved by SSSP without the need for filler pre-modification. Relative to neat LDPE, the non-isothermal crystallization onset temperature, percentage crystallinity and Young's modulus of crosslinked LDPE decreases with increasing crosslinking density. The incorporation of well-dispersed and well-exfoliated graphite enhanced the non-isothermal crystallization onset temperature, Young's modulus and ultimate strength of nanocomposites relative to corresponding neat PE matrices; in contrast, the polymer percentage crystallinity was unaffected within experimental error. The incorporation of chemical crosslinks and well-dispersed graphite synergistically enhance the wear resistance of crosslinked nanocomposites relative to neat LDPE, with chemical crosslinks playing the stronger role in reducing the wear rate. In the optimum circumstance encountered here, 3DCP-LDPE/3G exhibited a wear volume that is 88% less than that of neat LDPE. Crosslinked LDPE/graphite nanocomposites provide a simple method to improve the poor wear performance of neat LDPE and thus providing low-cost materials for high-end uses where wear resistance is important, e.g., coatings. Moreover, relative to UHMWPE which also provides high wear resistance, the nanocomposite precursors prepared in our study exhibit much more versatile melt processability, including that involved in applications such as powder coating and rotational molding.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for forming a polyolefin nanocomposite precursor composition, the method comprising mixing a polyolefin, unmodified graphite, and a peroxide crosslinker via solid-state shear pulverization under conditions to form a polyolefin nanocomposite precursor composition comprising the polyolefin; exfoliated, unmodified graphite dispersed throughout the polyolefin; and unreacted peroxide crosslinker dispersed throughout the polyolefin, wherein the polyolefin is polyethylene, a copolymer of polyethylene, or combinations thereof.

2. The method of claim 1, wherein the solid-state shear pulverization is carried out at a temperature below a melting temperature of the polyolefin and below a dissociation temperature of the peroxide crosslinker.

3. The method of claim 1, wherein the polyolefin nanocomposite precursor composition has a diffraction peak at 26.5° having a normalized intensity that is within 5% of that of the polyolefin without the unmodified graphite and without the peroxide crosslinker as measured by X-ray diffraction.

4. The method of claim 1, wherein the peroxide crosslinker is added at a later stage after an initial mixing of the polyolefin and the unmodified graphite.

5. The method of claim 1, wherein the polyolefin is low-density polyethylene.

6. The method of claim 1, wherein the peroxide crosslinker is dicumyl peroxide; cumene hydroperoxide; t-butyl peroxide; 2,5-Bis(tert-butylperoxy)-2,5-dimethylhexane; 2,5-Bis(tert-butylperoxy)-2,5-dimethyl-3-hexyne; Bis[1-(tert-butylperoxy)-1-methylethyl]benzene; or combinations thereof.

7. The method of claim 6, wherein the peroxide crosslinker is dicumyl peroxide.

8. The method of claim 1, wherein the unmodified graphite is present at an amount in a range of from 1 weight % to 7 weight % and the peroxide crosslinker is present at an amount in a range of from 1 weight % to 7 weight %.

9. The method of claim 1, wherein the polyolefin nanocomposite precursor composition consists of the polyolefin, the unmodified graphite, the peroxide crosslinker, and optionally, one or more of a dye, a preservative, and an antioxidant.

10. The method of claim 1, further comprising subjecting the polyolefin nanocomposite precursor composition to a melt processing technique under conditions to induce chemical reactions to crosslink chains of polyolefin, thereby forming a crosslinked polyolefin nanocomposite.

11. The method of claim 10, wherein the conditions fully cure the polyolefin nanocomposite precursor composition as measured using differential scanning calorimetry.

12. The method of claim 10, wherein the crosslinked polyolefin nanocomposite is characterized by a reduction in wear volume of at least 80% as compared to a comparative material formed from the polyolefin without the unmodified graphite and without the peroxide crosslinker using the same melt processing technique under the same conditions.

* * * * *